US012761531B2

(12) United States Patent
Hong et al.

(10) Patent No.: US 12,761,531 B2
(45) Date of Patent: Oct. 13, 2026

(54) CAMERA MODULE

(71) Applicant: SAMSUNG ELECTRO-MECHANICS CO., LTD., Suwon-si (KR)

(72) Inventors: Jong Woo Hong, Suwon-si (KR); Hong Joo Lee, Suwon-si (KR); Nam Ki Park, Suwon-si (KR); Ji Buem Chun, Suwon-si (KR); Jae Hyung Han, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 58 days.

(21) Appl. No.: 18/976,725

(22) Filed: Dec. 11, 2024

(65) Prior Publication Data

US 2025/0264778 A1 Aug. 21, 2025

(30) Foreign Application Priority Data

Feb. 19, 2024 (KR) ........................ 10-2024-0023683

(51) Int. Cl.
*G03B 13/36* (2021.01)
*G03B 5/06* (2021.01)
(Continued)

(52) U.S. Cl.
CPC ............... *G03B 13/36* (2013.01); *G03B 5/06* (2013.01); *G03B 17/12* (2013.01); *H04N 23/54* (2023.01); *H04N 23/687* (2023.01)

(58) Field of Classification Search
CPC ........ G03B 13/36; G03B 17/12; G03B 30/00; G03B 5/06; G03B 13/34;
(Continued)

(56) References Cited

U.S. PATENT DOCUMENTS 11,792,516 B1 * 10/2023 Patel ...................... H04N 23/54 348/294
2009/0128647 A1 * 5/2009 Fahn .................... H04N 23/695 348/E5.037
(Continued)

FOREIGN PATENT DOCUMENTS

CN 117221723 A * 12/2023 ............. H04N 23/55
JP 2011-232617 A 11/2011
(Continued)

OTHER PUBLICATIONS

Korean Office Action Issued on Feb. 3, 2026, in Counterpart Korean Patent Application No. 10-2024-0023683 (5 Pages in English, 5 Pages in Korean).

*Primary Examiner* — Lin Ye
*Assistant Examiner* — Steven Daniel Barry
(74) *Attorney, Agent, or Firm* — NSIP Law

(57) ABSTRACT

A camera module is provided. The camera module includes a lens module including at least one lens, a carrier that accommodates the lens module and is configured to move in an optical axis direction, a housing that accommodates the carrier, a focus adjustment driving unit including a focus adjustment magnet disposed on the carrier and a focus adjustment coil disposed on the housing to face the focus adjustment magnet and configured to generate a driving force to move the carrier in the optical axis direction, and a first ball group disposed between the carrier and the housing to guide movement of the carrier in the optical axis direction, wherein a gap between the focus adjustment magnet and the focus adjustment coil increases or decreases in a longitudinal direction of the focus adjustment magnet.

16 Claims, 7 Drawing Sheets

(51) Int. Cl.
*G03B 17/12* (2021.01)
*H04N 23/54* (2023.01)
*H04N 23/68* (2023.01)

(58) Field of Classification Search
CPC ......... G03B 2205/0069; H04N 23/687; H04N 23/54; H04N 23/57; H04N 23/55
USPC .......................................................... 348/345
See application file for complete search history.

(56) References Cited

U.S. PATENT DOCUMENTS

| | | | | |
|---|---|---|---|---|
| 2014/0098434 | A1 | 4/2014 | Baik et al. | |
| 2017/0205600 | A1 * | 7/2017 | Kim ......................... | G02B 7/08 |
| 2019/0174044 | A1 * | 6/2019 | Honsho ................ | G02B 27/646 |
| 2020/0363626 | A1 | 11/2020 | Seo et al. | |
| 2021/0173226 | A1 | 6/2021 | Lee et al. | |

FOREIGN PATENT DOCUMENTS

| | | | | |
|---|---|---|---|---|
| KR | 10-1328301 | B1 | 11/2013 | |
| KR | 101792431 | B1 * | 10/2017 | ........... G02B 27/646 |
| KR | 10-2021-0048037 | A | 5/2021 | |
| KR | 10-2021-0073420 | A | 6/2021 | |
| KR | 10-2376509 | B1 | 3/2022 | |

* cited by examiner

CAMERA MODULE

CROSS-REFERENCE TO RELATED APPLICATIONS

This application claims the benefit under 35 USC § 119(a) of Korean Patent Application No. 10-2024-0023683 filed on Feb. 19, 2024, in the Korean Intellectual Property Office, the entire disclosure of which is incorporated herein by reference for all purposes.

BACKGROUND

1. Field

The following description relates to a camera module.

2. Description of Related Art

Camera modules are implemented in portable electronic devices, such as, but not limited to, smartphones, tablet personal computers (PCs), and laptops.

Most camera modules implemented in portable electronic devices have an autofocusing (AF) operation and an optical imaging stabilization (OIS) operation, and a zoom operation may be added thereto.

Among the above camera module operations, it is important to ensure linearity of movement in the autofocusing operation to prevent tilt.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a lens module comprising at least one lens; a carrier, that accommodates the lens module, and is configured to move in an optical axis direction; a housing that accommodates the carrier; a focus adjustment driving unit comprising a focus adjustment magnet disposed on the carrier and a focus adjustment coil disposed on the housing to face the focus adjustment magnet, and configured to generate a driving force to move the carrier in the optical axis direction; and a first ball group disposed between the carrier and the housing to guide movement of the carrier in the optical axis direction, wherein a gap between the focus adjustment magnet and the focus adjustment coil increases or decreases in a longitudinal direction of the focus adjustment magnet.

The camera module may include a substrate on which the focus adjustment coil is disposed, wherein the focus adjustment coil is patterned and formed on one surface of the substrate.

The camera module may include a position sensor disposed on one surface of the substrate, wherein the position sensor protrudes further from one surface of the substrate toward the focus adjustment magnet than the focus adjustment coil.

The gap between the focus adjustment magnet and the focus adjustment coil may increase from a first side of the focus adjustment magnet to a second side of the focus adjustment magnet in the longitudinal direction, and the position sensor may be disposed to face the second side of the focus adjustment magnet.

The camera module may include a first yoke disposed to face the focus adjustment magnet with the focus adjustment coil interposed therebetween, wherein the first yoke may be provided as a magnetic material to generate an attractive force with the focus adjustment magnet.

The gap between the focus adjustment magnet and the focus adjustment coil may increase from a first side of the focus adjustment magnet to a second side of the focus adjustment magnet in the longitudinal direction, and the first ball group may include a first ball member disposed to be close to the first side of the focus adjustment magnet in the longitudinal direction; and a second ball member disposed to be close to the second side of the focus adjustment magnet in the longitudinal direction.

A number of contact points at which the first ball member contacts the carrier and the housing may be greater than a number of contact points at which the second ball member contacts the carrier and the housing.

The carrier may include a seating recess comprising an inclined surface that is disposed obliquely with respect to the focus adjustment coil, and in which the focus adjustment magnet is disposed.

The camera module may include a back yoke disposed between the carrier and the focus adjustment magnet, wherein the back yoke is arranged parallel to the focus adjustment magnet.

The camera module may further include a first frame and a second frame that accommodate the lens module, and are configured to move in a direction, perpendicular to the optical axis direction.

In a general aspect, a camera module includes a housing that accommodates a lens module; a carrier, configured to move in an optical axis direction with respect to the housing; a first ball member and a second ball member disposed between the housing and the carrier, spaced apart from each other in a first axis direction, perpendicular to the optical axis direction, and respectively including one or more balls; a driving unit comprising a focus adjustment magnet disposed on the carrier; and a yoke facing the focus adjustment magnet in a second axis direction, perpendicular to the optical axis direction and the first axis direction, wherein a number of balls included in the first ball member is greater than a number of balls included in the second ball member, and a gap between the yoke and the focus adjustment magnet decreases at a position closer to the first ball member than the second ball member.

The focus adjustment magnet may be disposed between the first ball member and the second ball member, the yoke is disposed on the housing, and the focus adjustment magnet may be disposed obliquely with respect to the yoke.

A focus adjustment coil, facing the focus adjustment magnet in the second axis direction, may be disposed on the housing, and the focus adjustment magnet may be disposed obliquely with respect to the focus adjustment coil.

The camera module may further include a substrate on which the focus adjustment coil is disposed, wherein the focus adjustment coil may be patterned and formed on a first surface of the substrate.

The camera module may include a position sensor disposed on the first surface of the substrate, wherein the position sensor protrudes further from the first surface of the substrate toward the focus adjustment magnet than the focus adjustment coil.

A gap between the focus adjustment magnet and the focus adjustment coil may increase from a first side of the focus adjustment magnet to a second side of the focus adjustment magnet in the longitudinal direction, and the position sensor may be disposed to face the second side of the focus adjustment magnet.

Other features and aspects will be apparent from the following detailed description, the drawings, and the claims.

Figure 1:
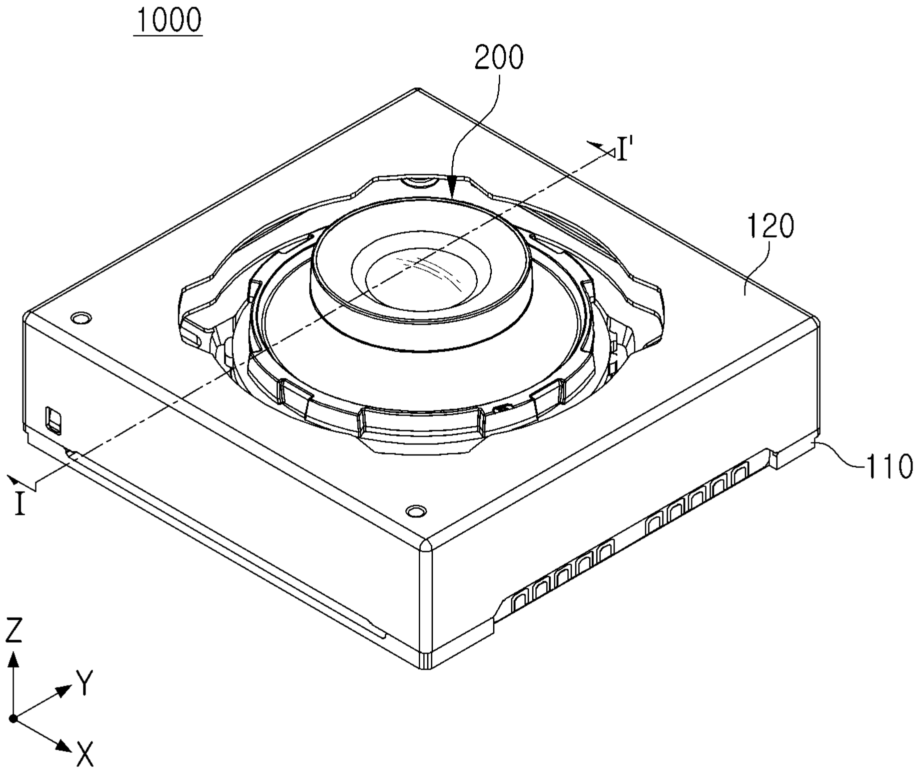
FIG. 1 illustrates a perspective view of an example camera module, in accordance with one or more embodiments.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

Although terms such as “first,” “second,” and “third”, or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as “on,” “connected to,” “coupled to,” or “joined to” another component, element, or layer, it may be directly (e.g., in contact with the other component, element, or layer) “on,” “connected to,” “coupled to,” or “joined to” the other component element, or layer, or there may reasonably be one or more other components elements, or layers intervening therebetween. When a component or element is described as “directly on”, “directly connected to,” “directly coupled to,” or “directly joined to” another component element, or layer, there can be no other components, elements, or layers intervening therebetween. Likewise, expressions, for example, “between” and “immediately between” and “adjacent to” and “immediately adjacent to” may also be construed as described in the foregoing.

The terminology used herein is for describing various examples only and is not to be used to limit the disclosure. The articles “a,” “an,” and “the” are intended to include the plural forms as well, unless the context clearly indicates otherwise. As non-limiting examples, terms “comprise” or “comprises,” “include” or “includes,” and “have” or “has” specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms “comprise” or “comprises,” “include” or “includes,” and “have” or “has” specify the presence of stated features, numbers, operations, members, elements, and/or combinations thereof, other embodiments may exist where one or more of the stated features, numbers, operations, members, elements, and/or combinations thereof are not present.

As used herein, the term “and/or” includes any one and any combination of any two or more of the associated listed items. The phrases “at least one of A, B, and C”, “at least one of A, B, or C”, and the like are intended to have disjunctive meanings, and these phrases “at least one of A, B, and C”, “at least one of A, B, or C”, and the like also include examples where there may be one or more of each of A, B, and/or C (e.g., any combination of one or more of each of A, B, and C), unless the corresponding description and embodiment necessitates such listings (e.g., “at least one of A, B, and C”) to be interpreted to have a conjunctive meaning.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term “may” herein with respect to an example or embodiment (e.g., as to what an example or embodiment may include or implement) means that at least one example or embodiment exists where such a feature is included or implemented, while all examples are not limited thereto. The use of the terms “example” or “embodiment” herein have a same meaning (e.g., the phrasing “in one example” has a same meaning as “in one embodiment”, and “one or more examples” has a same meaning as “in one or more embodiments”).

One or more operations may provide a camera module which has improved focusing performance, while having a reduced number of parts and a reduced price.

The following description relates to a camera module 1000, which may be applied to, or implemented in, portable electronic devices, such as, but not limited to, smartphones, and used to capture an image or a video of an external subject.

Figure 2:
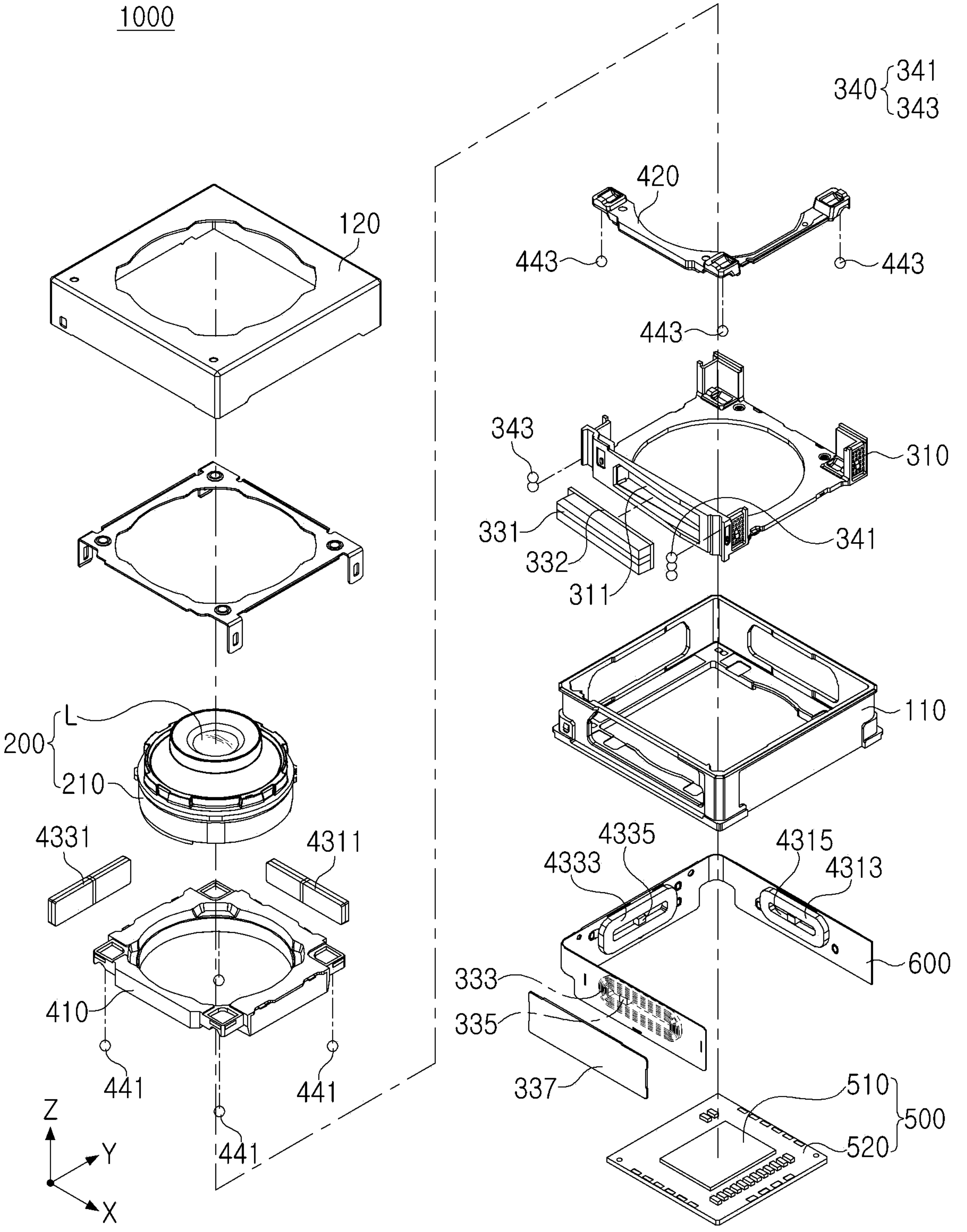
FIG. 2 illustrates a schematic exploded perspective view of an example camera module, in accordance with one or more embodiments.

FIG. 1 illustrates a perspective view of an example camera module, in accordance with one or more embodiments, and FIG. 2 illustrates a schematic exploded perspective view of an example camera module, in accordance with one or more embodiments.

Referring to FIGS. 1 and 2, the example camera module 1000, in accordance with one or more embodiments, may include a lens module 200 a focus adjustment unit that moves the lens module 200 in an optical axis direction (the Z-axis direction), a shake correction unit that moves the lens module 200 in a direction (X- and Y-axis directions), perpendicular to the optical axis (Z-axis), an image sensor module 500 that converts light incident on the lens module 200 into an electrical signal, and a housing 110 and a case 120 that accommodates the components listed above.

The housing 110 may have a rectangular box shape with an internal space. For example, the housing 110 may have a top and bottom and at least three sides that are open. The lens module 200, the focus adjustment unit, and the shake correction unit may be accommodated in the internal space of the housing 110, and the image sensor module 500 may be disposed below the housing 110. In an example, a substrate 600 on which portions of the focus adjustment unit and the shake correction unit are mounted may be disposed on the sides of the housing 110.

The case 120 may be coupled to the housing 110 with the components listed above accommodated and disposed in the housing 110. In an example, the case 120 may cover the internal space, while surrounding the four sides of the housing 110.

The case 120 may be coupled to the housing 110 and may have an operation of protecting components accommodated and disposed in the housing 110.

Additionally, the case 120 may perform the operation of shielding components within the housing from electromagnetic waves. Therefore, electromagnetic waves generated by the camera module 1000 may not affect other electronic components within a portable electronic device, or conversely, electromagnetic waves generated by other electronic components within a portable electronic device may not affect the camera module 1000.

Accordingly, the case 120 may be formed of a metal material, and may be grounded to a ground pad of a printed circuit board (hereinafter, referred to as a sensor board 520) of the image sensor module 500 disposed below the housing 110.

The image sensor module 500 may include an image sensor 510 and the sensor substrate 520 on which the image sensor 510 is mounted.

The image sensor 510 may convert light incident through the lens module 200 into an electrical signal. In an example, the image sensor 510 may be a charge coupled device (CCD) or a complementary metal-oxide semiconductor (CMOS), as examples. The electrical signal converted by the image sensor 510 may be output as an image or a video through a display device of a portable electronic device.

The image sensor 510 may be electrically connected to the sensor substrate 520 through, as an example, wire bonding, etc.

Although not illustrated in the drawing, the image sensor module 500 may further include an infrared (IR) cut filter. The IR cut filter may be disposed above the image sensor 510 to block light in an infrared region, in light incident through the lens module 200, from entering the image sensor 510.

The lens module 200 may include a lens barrel 210 in which at least one lens L is accommodated. in an example, the lens barrel 210 may have a hollow cylindrical shape, and the at least one lens L may be mounted in the lens barrel 210 in the optical axis direction (the Z-axis direction).

The lens module 200 may be configured to move in the optical axis direction (the Z-axis direction) and in directions (the X-axis and Y-axis directions), perpendicular to the optical axis. For example, the lens module 200 may be moved in the optical axis direction (the Z-axis direction) by the focus adjustment unit during focus adjustment, and may be moved in the directions (the X-axis and Y-axis directions), perpendicular to the optical axis, by the shake correction unit 400 during shake correction.

Figure 3:
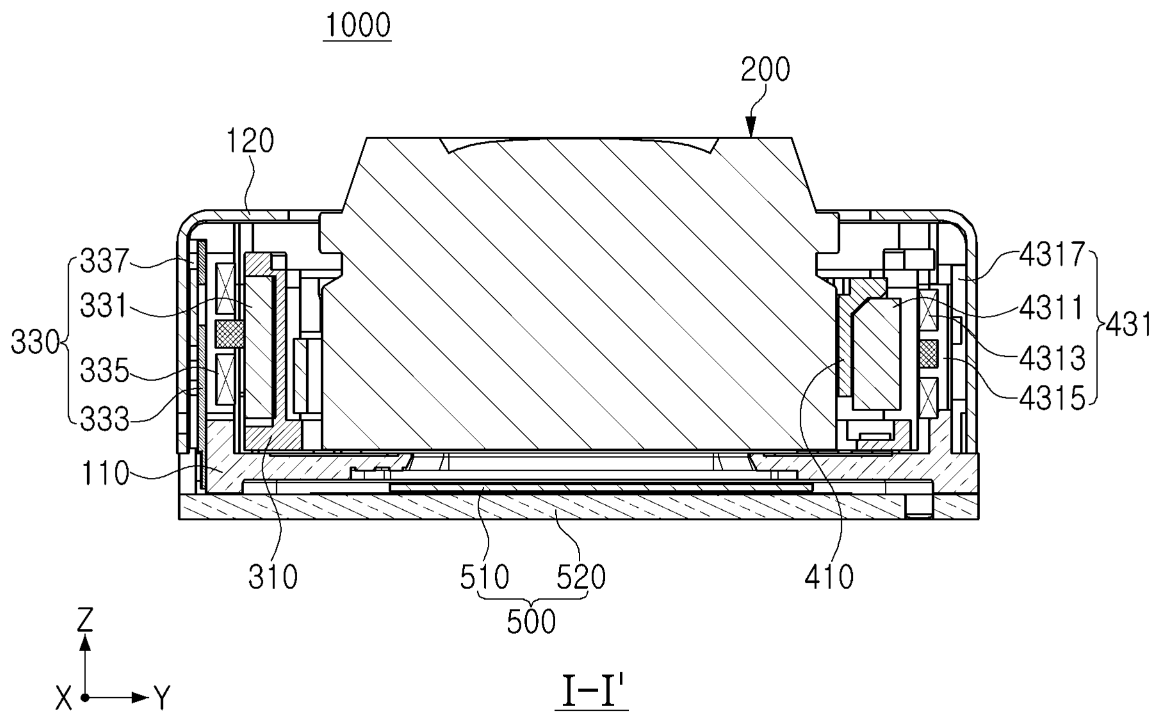
FIG. 3 illustrates a cross-sectional view taken along line I-I' of FIG. 1.

Referring to FIG. 3, the lens module 200, the focus adjustment unit, and the shake correction unit 400 may be movable portions accommodated in the internal space of the housing 110 and may be moved relative to the housing 110 and the case 120, and the housing 110 and case 120 may be fixed portions. In an example, portions of the focus adjustment unit and the shake correction unit 400 may be disposed on the housing 110, which may be fixed portions not moved in the optical axis direction (the Z-axis direction) and/or in the directions (the X-axis and Y-axis directions), perpendicular to the optical axis.

Hereinafter, the focus adjustment unit, in accordance with one or more embodiments, is described with reference to FIGS. 3 to 6.

Figure 4:
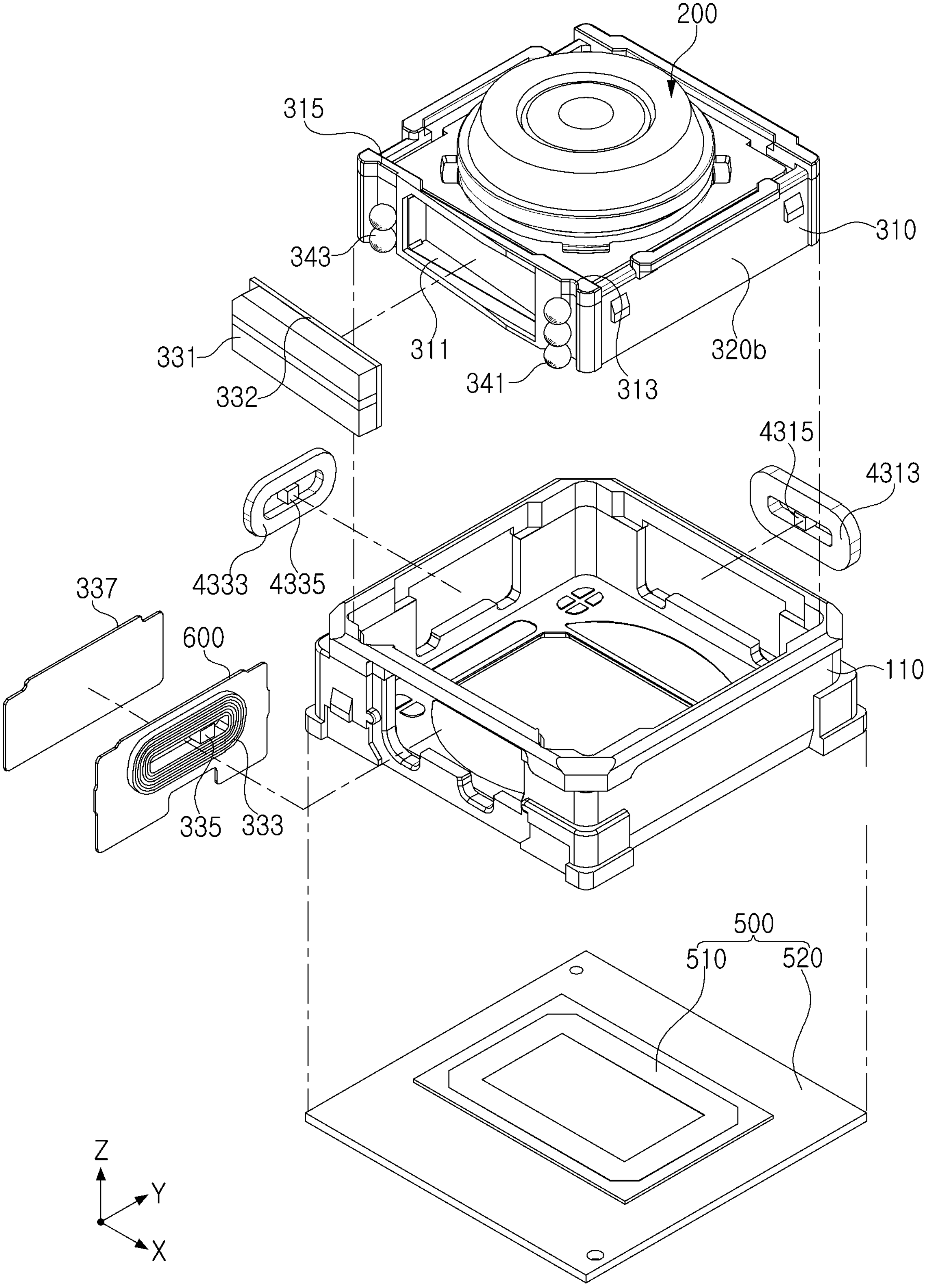
FIG. 4 illustrates an exploded perspective view of a focus adjustment unit, in accordance with one or more embodiments.
Figure 5:
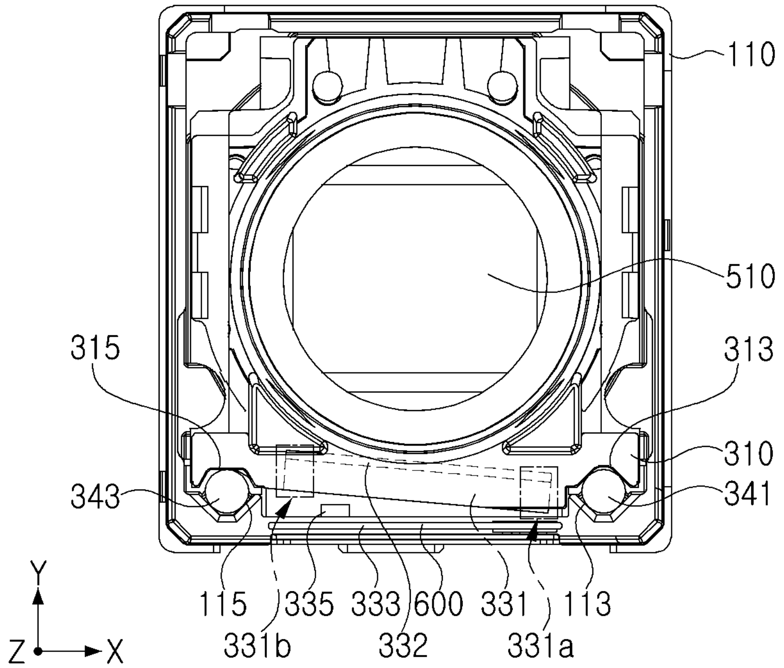
FIG. 5 illustrates a plan view of a focus adjustment unit, in accordance with one or more embodiments.
Figure 6:
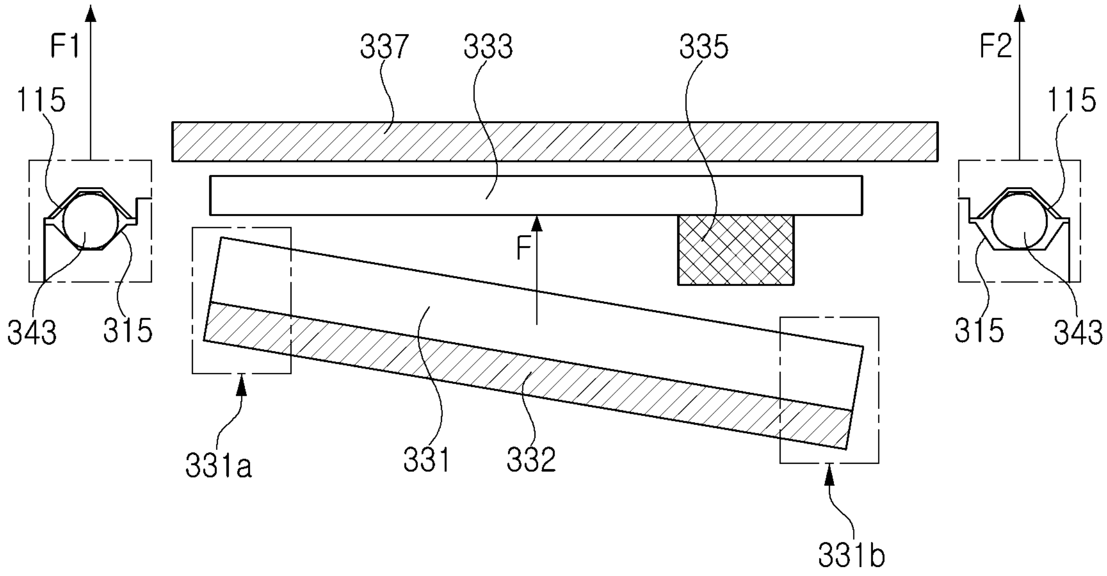
FIG. 6 illustrates a conceptual diagram of a focus adjustment unit, in accordance with one or more embodiments.

FIG. 3 is a cross-sectional view taken along line I-I' of FIG. 1, FIG. 4 is an exploded perspective view of the focus adjustment unit, in accordance with one or more embodiments, FIG. 5 is a plan view of the focus adjustment unit, in accordance with one or more embodiments, and FIG. 6 is a conceptual diagram of a focus adjustment unit, in accordance with one or more embodiments.

The focus adjustment unit may be a portion adjusting focus so that the subject is in focus. Specifically, the focus adjustment unit may adjust focus by moving the lens module 200 in the optical axis direction (the Z-axis direction).

The focus adjustment unit may include a carrier 310 that guides a movement of the lens module 200 in the optical axis direction (the Z-axis direction) and a focus adjustment driving unit 330 that generates a driving force in the optical axis direction (the Z-axis direction).

The carrier 310 may be provided with a space into which the lens barrel 210 may be inserted. The lens barrel 210 may be arranged to penetrate through the carrier 310 in the optical axis direction (the Z-axis direction).

The carrier 310 may be moved relative to the housing 110 in the optical axis direction (the Z-axis direction), while accommodated in the housing 110. The lens barrel 210 may be moved in the optical axis direction (the Z-axis direction) together with the carrier 310, while accommodated in the carrier 310.

The focus adjustment driving unit 330 may generate a driving force to move the carrier 310 in the optical axis direction (the Z-axis direction).

The focus adjustment driving unit 330 may include a focus adjustment magnet 331 and a focus adjustment coil 333 arranged to face each other. In an example, the focus adjustment magnet 331 may be disposed on one side of the carrier 310, and the focus adjustment coil 333 may be disposed on one side of the housing 110 to face the focus adjustment magnet 331. Accordingly, the focus adjustment magnet 331 may be a moving member that moves in the optical axis direction (the Z-axis direction) together with the carrier 310, and the focus adjustment coil 333 may be a fixed member that is fixed to the housing 110. However, positions of the focus adjustment magnet 331 and the focus adjustment coil 333 may be interchanged.

The focus adjustment coil 333 may be mounted on the housing 110 via a printed circuit board (hereinafter referred to as a substrate) 600. According to one or more embodiments, the focus adjustment coil 333 may be a fine pattern coil (FP coil) that is formed by patterning a metal layer on an insulating layer of the substrate 600. In the example of fine pattern coils, a driving force may increase as a gap between patterns decreases.

When the focus adjustment coil 333 is provided as a fine pattern coil, a separate process for electrically connecting the focus adjustment coil 333 to the substrate 600 may not be needed, so the manufacturing process may be simplified. Additionally, since the fine pattern coil may be thinner than a winding coil, a gap between the focus adjustment magnet 331 and the focus adjustment coil 333 may decrease, which may be advantageous in miniaturizing the camera module 1000.

According to one or more embodiments, the focus adjustment magnet 331 may be disposed obliquely with respect to the focus adjustment coil 333. Since the focus adjustment magnet 331 is disposed obliquely with respect to the focus adjustment coil 333, a gap between one side 331*a* of the focus adjustment magnet and the focus adjustment coil 333 may be less than a gap between the other side 331*b* of the focus adjustment magnet and the focus adjustment coil 333.

The focus adjustment magnet 331 may be disposed in a seating recess portion 311 formed on one side of the carrier 310, and the seating recess portion 311 may be provided as an inclined surface so that the focus adjustment magnet 331 is tilted obliquely with respect to the focus adjustment coil 333.

A back yoke 332 that focuses a magnetic force generated by the focus adjustment magnet 331 may be disposed between the focus adjustment magnet 331 and the carrier 310. In an example, the back yoke 332 may be insert-molded into the carrier 310 to be integrally provided with the carrier 310, and may be exposed externally through the seating recess portion 311. The back yoke 332 may be disposed on the inclined surface of the seating recess portion 311, and thus may be disposed parallel to the focus adjustment magnet 331.

The focus adjustment driving unit 330 may use a closed-loop control method of detecting a position of the lens module 200 and providing feedback during focus adjustment. Accordingly, the focus adjustment driving unit 330 may include a position sensor 335 that senses the position of the lens module 200 in the optical axis direction (the Z-axis direction) through the focus adjustment magnet 331. In a non-limited example, the position sensor 335 may be a Hall sensor.

The position sensor 335 may be disposed on the substrate 600 together with the focus adjustment coil 333, and may face the focus adjustment magnet 331. The position sensor 335 may be disposed not to overlap the pattern of the focus adjustment coil 333 provided on one surface of the substrate 600 facing the focus adjustment magnet 331. In an example, the position sensor 335 may be disposed inside or outside the focus adjustment coil 333.

In an example, the position sensor 335 may be disposed to face the other side 331*b* of the focus adjustment magnet 331*b* in which the gap between the focus adjustment magnet 331 and the focus adjustment coil 333 is relatively large. In an example, since the focus adjustment coil 333 may be provided as a fine pattern coil, the position sensor 335 may protrude further toward the focus adjustment magnet 331 from one surface of the substrate 600 than the focus adjustment coil 333. That is, a thickness of the position sensor 335 may be greater than a thickness of the focus adjustment coil 333. Therefore, in an example, a space in which the position sensor 335 may be disposed may be secured by disposing the focus adjustment magnet 331 obliquely with respect to the focus adjustment coil 333.

A first yoke 337 may be disposed on the other surface of the substrate 600 (in an example, the other surface refers to a surface opposite to the surface on which the focus adjustment coil 333 is disposed). The first yoke 337 may prevent leakage of magnetic flux generated by the focus adjustment magnet 331. Additionally, the first yoke 337 may form an attractive force with the focus adjustment magnet 331. Details thereof are described below.

A first ball group 340 may be disposed between the carrier 310 and the housing 110 to guide movement of the carrier 310 and maintain the gap therebetween.

The first ball group 340 may include a first ball member 341 disposed to be close to one longitudinal side 331*a* of the focus adjustment magnet 331 and a second ball member 343 disposed to be close to the other longitudinal side 331*b* of the focus adjustment magnet 331.

The first ball member 341 and the second ball member 343 may include a plurality of ball members arranged in the optical axis direction (the Z-axis direction), and may respectively include different numbers of ball members.

Referring to the accompanied drawings, in an example, the first ball member 341 may include three ball members, and the second ball member 343 may include two ball members. In another examples, the number of ball members included in the first ball member 341 and the second ball member 343 may be changed. However, in an example, the first ball member 341 may include more ball members than the second ball member 343.

In an example, the first ball group 340, that is, the first ball member 341 and the second ball member 342, may guide a movement of the carrier 310 in the optical axis direction (the Z-axis direction) when a driving force is generated in the optical axis direction (the Z-axis direction) of the carrier 310.

The carrier 310 and the housing 110 may include guide recess portions 313, 315, 113, and 115 which extend in the optical axis direction (the Z-axis direction) on surfaces thereof facing each other in a direction, perpendicular to the optical axis (the Z-axis), for example, in the first axis direction (the Y-axis direction) based on the drawing.

In an example, the carrier 310 may include a first guide recess portion 313 disposed to be adjacent to one side 331*a* of the focus adjustment magnet 331 and a second guide recess portion 315 disposed to be adjacent to the other side 331*b* of the focus adjustment magnet 331, and the housing 110 may include a third guide recess portion 113 disposed to face the first guide recess portion 313, and a fourth guide recess portion 115 disposed to face the second guide recess portion 315.

The first ball member 341 may roll in the optical axis direction (the Z-axis direction), while being inserted into the first guide recess portion 313 and the third guide recess portion 113, and the second ball member 343 may roll in the optical axis direction (the Z-axis direction), while being inserted into the second guide recess portion 315 and the fourth guide recess portion 115.

In an example, the first guide recess portion 313 and the second guide recess portion 315 disposed on the carrier 310 may have different cross-sectional shapes. Accordingly, the number of contact points between the first ball member 341 and the first guide recess portion 313 and the number of contact points between the second ball member 343 and the second guide recess portion 315 may be different from each other.

Referring to FIG. 6, the first ball member 341 may contact each of the two sides of the first guide recess portion 313, while being inserted into the first guide recess portion 313. That is, in an example, the first ball member 341 may form two contact points with the first guide recess portion 313. In an example, the second ball member 343 may contact a bottom surface of the second guide recess portion 315, while being inserted into the second guide recess portion 315. That is, in an example, the second ball member 343 may form one contact point with the second guide recess portion 315.

According to this structure, the first guide recess portion 313 disposed on one side 331*a* of the focus adjustment magnet may be a main guide that guides a movement of the carrier 310 in the optical axis direction (the Z-axis direction) by providing a movement direction to the first ball member 341, and the second guide recess portion 315 disposed on the other side 331*b* of the focus adjustment magnet may be an auxiliary guide that stably supports movement of the carrier 310 in the optical axis direction (the Z-axis direction) by allowing the second ball member 343 to roll smoothly therein.

In an example, the third guide recess portion 113 that faces the first guide recess portion 313 in the housing 110, and the fourth guide recess portion 113 that faces the second guide recess portion 315 in the housing 110 may have the same cross-sectional shape, and for example, the third guide recess portion 113 may have the same cross-sectional shape as the first guide recess portion 313. Accordingly, the first ball member 341 and the second ball member 343 may each form two contact points with the respective third guide recess portion 113 and fourth guide recess portion 115.

In relation to the above description, the plurality of ball members included in the first ball member 341 and the second ball member 343 may not all be in contact with the guide recess portions 313, 315, 113, and 115. For example, at least some of the plurality of ball members included in the first ball member 341 and the second ball member 343 may have a smaller diameter than other ball members, and the corresponding ball members may not contact the guide recess portions 313, 315, 113, and 115. Instead, the corresponding ball members may contact a ball member disposed to be adjacent in the optical axis direction (the Z-axis direction) and may roll together in the optical axis direction (the Z-axis direction).

A first yoke 337 may be disposed in the housing 110 to maintain contact between the first ball group 340 and the guide recess portions 313, 315, 113, and 115. The first yoke 337 may be formed of a magnetic material. In an example, the first yoke 337 may be disposed in the housing 110 to face the focus adjustment magnet 331 in the first axis direction (the Y-axis direction), perpendicular to the optical axis. Accordingly, an attractive force F may be generated between the first yoke 337 and the focus adjustment magnet 331 in the first axis direction (the Y-axis direction), and the carrier 310 may be pressed toward the housing 110 by the attractive force.

In an example, the focus adjustment magnet 331 may be disposed obliquely with respect to the focus adjustment coil 333, and thus, the focus adjustment magnet 331 may also be disposed obliquely with respect to the first yoke 337.

Referring to FIG. 6, a gap between one side 331*a* of the focus adjustment magnet 331 and the first yoke 337 may be shorter than a gap between the other side 331*b* of the focus adjustment magnet and the first yoke 337.

In an example, the first guide recess portion 313 corresponding to the main guide may be disposed on one side 331*a* of the focus adjustment magnet, and the second guide recess portion 315 corresponding to an auxiliary guide may be disposed on the other side 331*b* of the focus adjustment magnet. Accordingly, the magnitude of pressing force F1 applied to the first ball member 341 disposed in the main guide may be greater than the magnitude of pressing force F2 applied to the second ball member 343 disposed in the auxiliary guide.

According to the above structure, the first ball member 341 may be in stable contact with the first guide recess portion 313 and the third guide recess portion 113, which are the main guides, and the second ball member 343 may smoothly roll in the second guide recess portion 315 and the fourth guide recess portion 115, which are auxiliary guides, and thus, linearity of movement of the carrier 310 in the optical axis direction (the Z-axis direction) may be secured and tilt defects may be improved.

Figure 7:
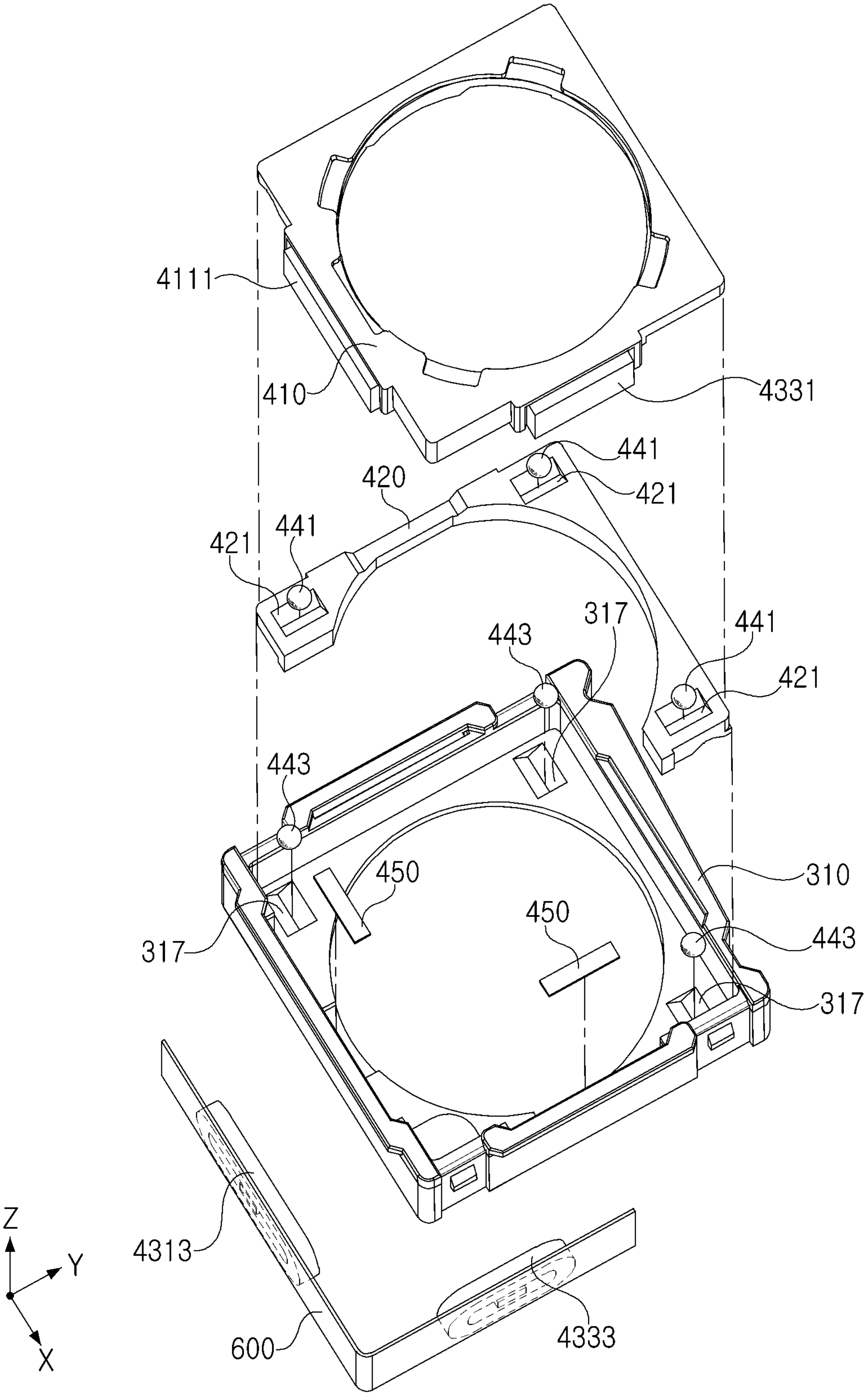
FIG. 7 and FIG. 8 are exploded perspective views of a shake correction unit, in accordance with one or more embodiments.
Figure 8:
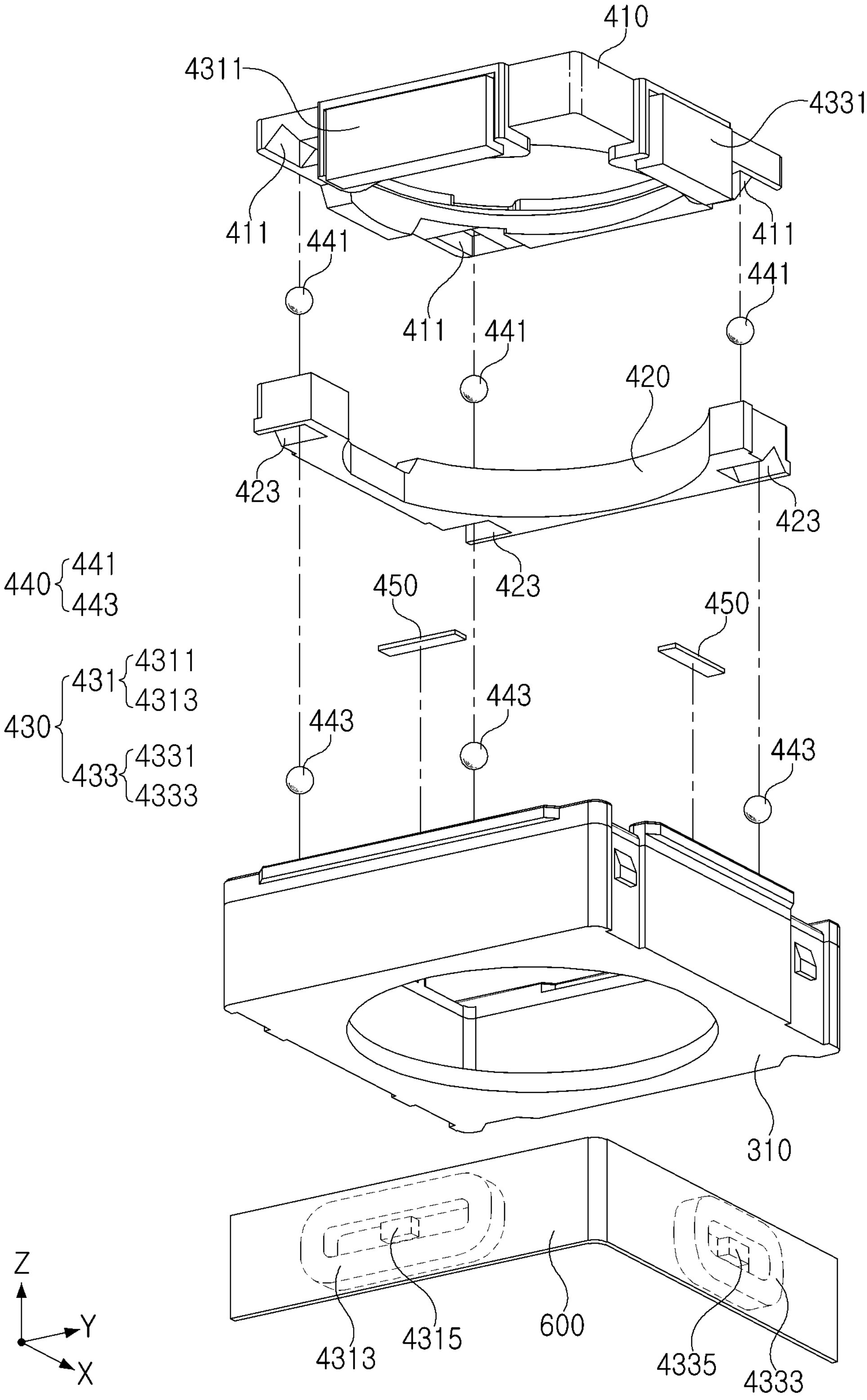

Next, the shake correction unit, in accordance with one or more embodiments, is described with reference to FIGS. 7 and 8.

The shake correction unit may be a part that corrects a shaking of an image or a video due to factors, such as a user's hand shaking during imaging. Specifically, the shake correction unit may correct shake by moving the lens module 200 in directions (the X-axis and Y-axis directions), perpendicular to the optical axis, based on a relative displacement corresponding to a shake that occurs when an image or video is captured.

The shake correction unit includes first and second frames 410 and 420 that guide a movement of the lens module 200 in directions (the X-axis and Y-axis directions), perpendicular to the optical axis, and a shake correction driving unit 430 that generates a driving force in the directions (the X-axis and Y-axis directions) perpendicular to the optical axis.

The first frame 410 and the second frame 420 may be accommodated in the carrier 310, and the first frame 410, the second frame 420, and the carrier 310 may be disposed in order according to the optical axis direction (the Z-axis direction). In an example, the first frame 410 may be disposed on the second frame 420, and the second frame 420 may be disposed on the carrier 310.

The first frame 410 and the second frame 420 may be provided with a space into which the lens barrel 210 may be inserted. The lens barrel 210 may be coupled to the first frame 410, and may be disposed to penetrate through the first frame 410 and the second frame 420 in the optical axis direction (the Z-axis direction).

The first frame 410 and the second frame 420 may be moved relative to the carrier 310 in directions (the X-axis and Y-axis directions), perpendicular to the optical axis, while accommodated in the carrier 310. Since the lens barrel 210 is coupled to the first frame 410, the lens barrel 210 may be moved together with the first frame 410. Additionally, since the first frame 410 is disposed on the second frame 420, the first frame 410 may be moved together with the second frame 420. In an example, the first frame 410 may be moved in the first axis direction (the Y-axis direction), perpendicular to the optical axis (the Z-axis), and the second frame 420 may be moved in the second axis direction (the X-axis direction), perpendicular to the optical axis (the Z-axis) and the first axis (the Y-axis).

The shake correction driving unit 430 may generate a driving force to move the first and second frames 410 and 420.

The shake correction driving unit 430 may include a first shake correction driving unit 431 which generates a driving force in the first axis direction (the Y-axis direction) and a second shake correction driving unit 433 which generates a driving force in the second axis direction (the X-axis direction). The first and second shake correction driving units 431 and 433 may be arranged to be perpendicular to each other.

The first and second shake correction driving units 431 and 433 may include shake correction magnets 4311 and 4331 and shake correction coils 4313 and 4333 arranged to face each other. In an example, the respective shake correction magnets 4311 and 4331 may be disposed on two sides of the first frame 410 perpendicular to each other, and the respective shake correction coils 4313 and 4333 may be disposed on two sides of the housing 110 perpendicular to each other to face the respective shake correction magnets 4311 and 4331. Accordingly, the shake correction magnets 4311 and 4331 may be moving members that move in the directions (the X-axis and Y-axis directions), perpendicular to the optical axis, together with the first frame 410, and the shake correction coils 4313 and 4333 may be fixing members that are fixed to the housing 110. However, the positions of the shake correction magnets 4311 and 4331 and the shake correction coils 4313 and 4333 may be changed.

The shake correction coils 4313 and 4333 may be mounted on the housing 110 via the substrate 600. In an example, the shake correction coils 4313 and 4333 may be provided as winding coils, unlike the focus adjustment coil 333. In another example, the shake correction coils 4313 and 4333 may be provided as fine pattern (FP) coils, similar to the focus adjustment coil 333.

Although not illustrated in the drawing, a back yoke may be disposed between the shake correction magnets 4311 and 4331 and the first frame 410 to focus a magnetic force generated by the shake correction magnets 4311 and 4331. The back yoke may be insert-molded into the first frame 410, and may be provided integrally with the first frame 410.

Similarly, a second 4317 and a third yoke (not shown) may be disposed on the other surface of the substrate 600 (here, the other surface means the surface opposite to the surface on which the shake correction coils 4313 and 4333 are disposed) to prevent leakage of magnetic flux generated by the shake correction magnets 4311 and 4331.

A second ball group 440 that guides a movement of the first and second frames 410 and 420 and maintains the gap between the above components may be disposed between the first frame 410 and the second frame 420 and between the second frame 420 and the carrier 310.

The second ball group 440 may include a third ball member 441 disposed between the first frame 410 and the second frame 420, and a third ball member 443 disposed between the second frame 420 and the carrier 310.

The third ball member 441 and the fourth ball member 443 may include a plurality of ball members. According to the accompanied drawings, in a non-limited example, the third ball member 441 and the fourth ball member 443 may each include three ball members, and the third ball member 441 and the fourth ball member 443 may include three or more ball members.

In an example, the third ball member 441 may guide movement of the first frame 410 in the first axis direction (the Y-axis direction) when a driving force is generated in the first axis direction (the Y-axis direction), and the fourth ball member 443 may guide a movement of the first frame 410 and the second frame 420 in the second axis direction (the X-axis direction) when a driving force is generated in the second axis direction (the X-axis direction).

The first frame 410 and the second frame 420 may include a fourth guide recess portion 411 and a fifth guide recess portion 421 each extending in the first axis direction (the Y-axis direction) on surfaces thereof facing each other in the optical axis direction (the Z-axis direction). The third ball member 441 may roll in the first axis direction (the Y-axis direction), while being inserted between the fourth guide recess portion 411 and the fifth guide recess portion 421 and movement of the third ball member 441 in the second axis direction (the X-axis direction) may be restricted.

The second frame 420 and the carrier 310 may include a sixth guide recess portion 423 and a seventh guide recess portion 317 each extending in the second axis direction (the X-axis direction) on surfaces thereof facing each other in the optical axis direction (the Z-axis direction). The fourth ball member 443 may roll in the second axis direction (the X-axis direction), while being inserted between the sixth guide recess portion 423 and the seventh guide recess portion 317, and movement of the fourth ball member 443 in the first axis direction (the Y-axis direction) may be restricted.

A pulling yoke 450 may be disposed on the carrier 310 to maintain contact between the second ball group 440 and the guide recess portions 411, 421, 423, and 317. The pulling yoke 450 may be formed of a magnetic material. In an example, the pulling yoke 450 may be disposed on the carrier 310 to face the magnets 4311 and 4331 disposed on the first frame 410 in the optical axis direction (the Z-axis direction). Accordingly, an attractive force may be generated between the pulling yoke 450 and the magnets 4311 and 4331 in the optical axis direction (the Z-axis direction), and the first frame 410 and the second frame 420 may be pressed toward the carrier 310 by the attractive force.

The shake correction driving unit 430 may use a closed-loop control method of detecting the position of the lens module 200 and providing feedback during shake correction. Accordingly, the first and second shake correction driving units 431 and 433 may include position sensors 4315 and 4335 which sense positions of the lens module 200 in the first axis direction (the Y-axis direction) and the second axis direction (the X-axis direction) through the shake correction magnets 4311 and 4331, respectively. In an example, the position sensors 4315 and 4335 may be Hall sensors. The position sensors 4315 and 4335 may be mounted on the substrate 600 to be disposed inside the shake correction coils 4313 and 4333 and may face the shake correction magnets 4311 and 4331.

The camera module according to the one or more examples may improve a posture difference when moving in the optical axis direction. Additionally, as some components are omitted, manufacturing costs may be reduced and driving stability may be ensured.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A camera module, comprising:

a lens module comprising at least one lens;

a carrier, that accommodates the lens module, and is configured to move in an optical axis direction;

a housing that accommodates the carrier;

a focus adjustment driving unit comprising a focus adjustment magnet disposed on the carrier and a focus adjustment coil disposed on the housing to face the focus adjustment magnet, and configured to generate a driving force to move the carrier in the optical axis direction; and a first ball group disposed between the carrier and the housing to guide movement of the carrier in the optical axis direction, wherein a gap between the focus adjustment magnet and the focus adjustment coil increases or decreases in a longitudinal direction of the focus adjustment magnet.

2. The camera module of claim 1, further comprising:

a substrate on which the focus adjustment coil is disposed, wherein the focus adjustment coil is patterned and formed on one surface of the substrate.

3. The camera module of claim 2, further comprising:

a position sensor disposed on one surface of the substrate, wherein the position sensor protrudes further from one surface of the substrate toward the focus adjustment magnet than the focus adjustment coil.

4. The camera module of claim 3, wherein:

the gap between the focus adjustment magnet and the focus adjustment coil increases from a first side of the focus adjustment magnet to a second side of the focus adjustment magnet in the longitudinal direction, and the position sensor is disposed to face the second side of the focus adjustment magnet.

5. The camera module of claim 1, further comprising:

a first yoke disposed to face the focus adjustment magnet with the focus adjustment coil interposed therebetween, wherein the first yoke is provided as a magnetic material to generate an attractive force with the focus adjustment magnet.

6. The camera module of claim 5, wherein:

the gap between the focus adjustment magnet and the focus adjustment coil increases from a first side of the focus adjustment magnet to a second side of the focus adjustment magnet in the longitudinal direction, and the first ball group comprises:

a first ball member disposed to be close to the first side of the focus adjustment magnet in the longitudinal direction; and a second ball member disposed to be close to the second side of the focus adjustment magnet in the longitudinal direction.

7. The camera module of claim 6, wherein a number of contact points at which the first ball member contacts the carrier and the housing is greater than a number of contact points at which the second ball member contacts the carrier and the housing.

8. The camera module of claim 1, wherein the carrier comprises a seating recess comprising an inclined surface that is disposed obliquely with respect to the focus adjustment coil, and in which the focus adjustment magnet is disposed.

9. The camera module of claim 1, further comprising:

a back yoke disposed between the carrier and the focus adjustment magnet, wherein the back yoke is arranged parallel to the focus adjustment magnet.

10. The camera module of claim 1, further comprising a first frame and a second frame that accommodate the lens module, and are configured to move in a direction, perpendicular to the optical axis direction.

11. A camera module, comprising:

a housing that accommodates a lens module;

a carrier, configured to move in an optical axis direction with respect to the housing;

a first ball member and a second ball member disposed between the housing and the carrier, spaced apart from each other in a first axis direction, perpendicular to the optical axis direction, and respectively including one or more balls;

a driving unit comprising a focus adjustment magnet disposed on the carrier; and a yoke facing the focus adjustment magnet in a second axis direction, perpendicular to the optical axis direction and the first axis direction, wherein a number of balls included in the first ball member is greater than a number of balls included in the second ball member, and a gap between the yoke and the focus adjustment magnet decreases at a position closer to the first ball member than the second ball member.

12. The camera module of claim 11, wherein:

the focus adjustment magnet is disposed between the first ball member and the second ball member, the yoke is disposed on the housing, and the focus adjustment magnet is disposed obliquely with respect to the yoke.

13. The camera module of claim 11, wherein:

a focus adjustment coil, facing the focus adjustment magnet in the second axis direction, is disposed on the housing, and the focus adjustment magnet is disposed obliquely with respect to the focus adjustment coil.

14. The camera module of claim 13, further comprising:

a substrate on which the focus adjustment coil is disposed, wherein the focus adjustment coil is patterned and formed on a first surface of the substrate.

15. The camera module of claim 14, further comprising:

a position sensor disposed on the first surface of the substrate, wherein the position sensor protrudes further from the first surface of the substrate toward the focus adjustment magnet than the focus adjustment coil.

16. The camera module of claim 15, wherein:

a gap between the focus adjustment magnet and the focus adjustment coil increases from a first side of the focus adjustment magnet to a second side of the focus adjustment magnet in the longitudinal direction, and the position sensor is disposed to face the second side of the focus adjustment magnet.

* * * * *